TIME MARK GENERATOR

Filed Oct. 28, 1968 2 Sheets-Sheet 1

INVENTORS.
KENNETH R. RUTHERFORD
FLOYD M. TOTTEN
EDWARD G. TUTHILL
BY Warren H. Kintzinger
ATTORNEY INVENTORS.
KENNETH R. RUTHERFORD
FLOYD M. TOTTEN
EDWARD G. TUTHILL
BY Warren H. Kintzinger
ATTORNEY

United States Patent Office

3,534,270
Patented Oct. 13, 1970

3,534,270

TIME MARK GENERATOR

Kenneth R. Rutherford and Floyd M. Totten, Cedar Rapids, and Edward G. Tilhill, Marion, Iowa, assignors to Collins Radio Company, Cedar Rapids, Iowa, a corporation of Iowa Filed Oct. 28, 1968, Ser. No. 771,206
Int. Cl. H03k *1/00*
U.S. Cl. 328—63 12 Claims

ABSTRACT OF THE DISCLOSURE

A time mark generator with a normally free running mode of operation subject to being repeatedly, in relatively shot time intervals, brought to sync registry along with time marker waveform control accuracy to an extremely high degree. A monostable multivibrator circuit is employed with a normally high voltage $\overline{Q}$ output connected as an input to an input NAND gate circuit of a signal clock generator having also an output NAND gate circuit and including a delay line with two sections with the output of the input NAND gate connected both directly to an input of the output NAND gate and also through a first section of the delay line to a second input of the output NAND gate. The second section of the delay line interconnects the first delay line section and an inhibit input of the input NAND gate to give desired waveform generating action. Further, marker position adjustment is provided by an external variable capacitor connected to internal RC timing circuitry of the monostable multivibrator, and marker spacing adjustment is provided through a variable capacitor connected between the junction of said first and second delay line section and ground.

Figure 1:
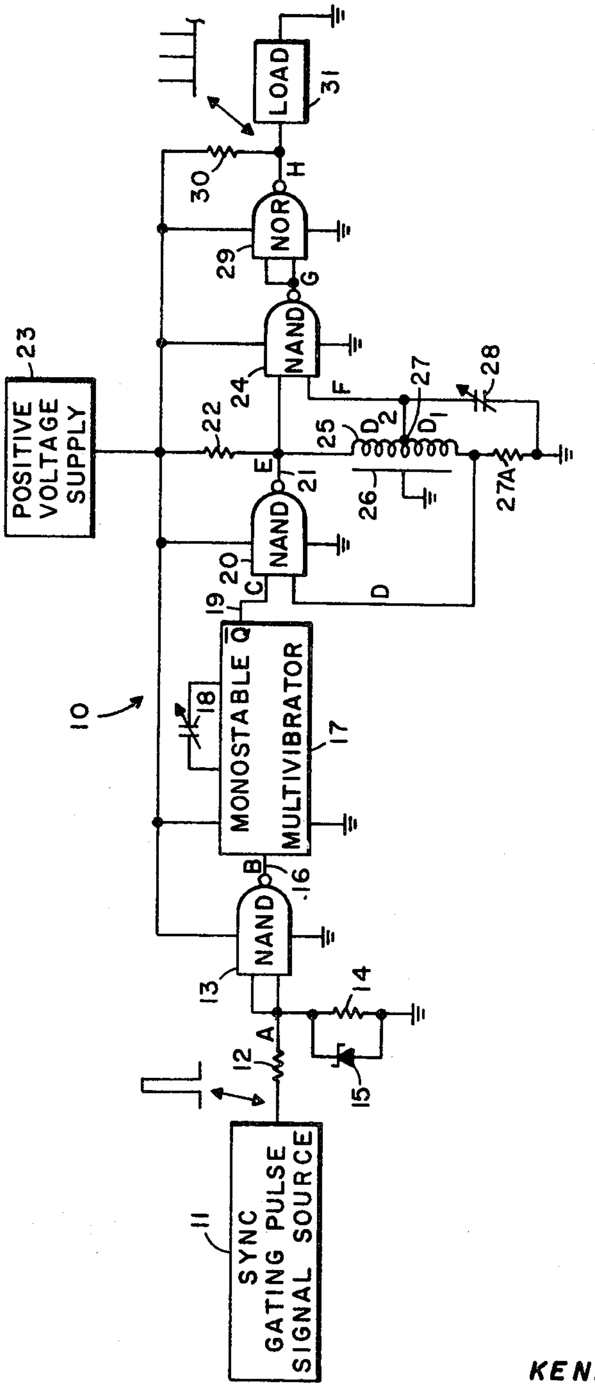

This invention relates in general to time mark signal generators, and in particular, to a time mark signal generator capable of operating in either a synchronous or free running mode of operation.

Most time mark generators heretofore available generally operate in only one of two modes, either a synchronous or a free running mode of operation. Further, adjustment problems are present with many of the available time mark generators along with excessive complexity, setting variation instability and other equipment temperamentalities, along with the factor of excessive expense.

It is, therefore, a principal object of this invention to provide a time mark generator capable if operation in either a free running mode of operation or in a synchronous mode.

A further object is to provide such a time mark generator that is brought to sync register every time a sync input pulse is applied. This enables application of such a generator for use providing narrow time mark pulses for an oscilloscope with the time mark pulse waveform brought and maintained in sync registry in a substantially rock steady reliable feshion every time a sync pulse is applied as initiated, for example, with each transponder response code transmission being checked and displayed, as they are continually being received, on the face of an oscilloscope tube for test, check, and adjustment.

Features of this invention useful in accomplishing the above objectives include, in a time mark generator, normally a free running mode of operation capable of being repeatedly, in relatively short time intervals, of being brought to sync registry and with time marker waveform control being provided to an extremely high degree of accuracy. The time mark generator is equipped with a Zener diode in the input circuit to a first micrologic NAND gate advantageously permitting a wide range of sync signal pulse amplitude, for example, 2 to 50 volts peak to peak, without undue difficulty. The output of the first NAND gate is passed as an input to a monostable multivibrator, the $\overline{Q}$ output of which is used in the circuit, having an external marker position adjusting capacitor connected to RC timing circuitry within the multivibrator micrologic circuit chip itself. The $\overline{Q}$ output is connected as an input to a second NAND gate that is part of a delay line and logic control gated pulse signal clock generator portion of the time mark generator. This portion includes a two section delay line with a loop back from the output of the second NAND gate. A tap between the two sections of the delay line is connected both as an input to a third NAND gate and through a marker spacing adjusting variable capacitor to ground. The other input to the third NAND gate is taken from the output if the second NAND gate, and with the two waveform inputs to the third NAND gate a relatively narrow pulse long period waveform, output is developed with highly repeatable characteristics admirably suited to use as a time mark signal either directly or as inverted through a NOR gate as may be desired.

A specific embodiment representing what is presently regarded as the best mode of carrying out the invention is illustrated in the accompanying drawings.

Figure 2:
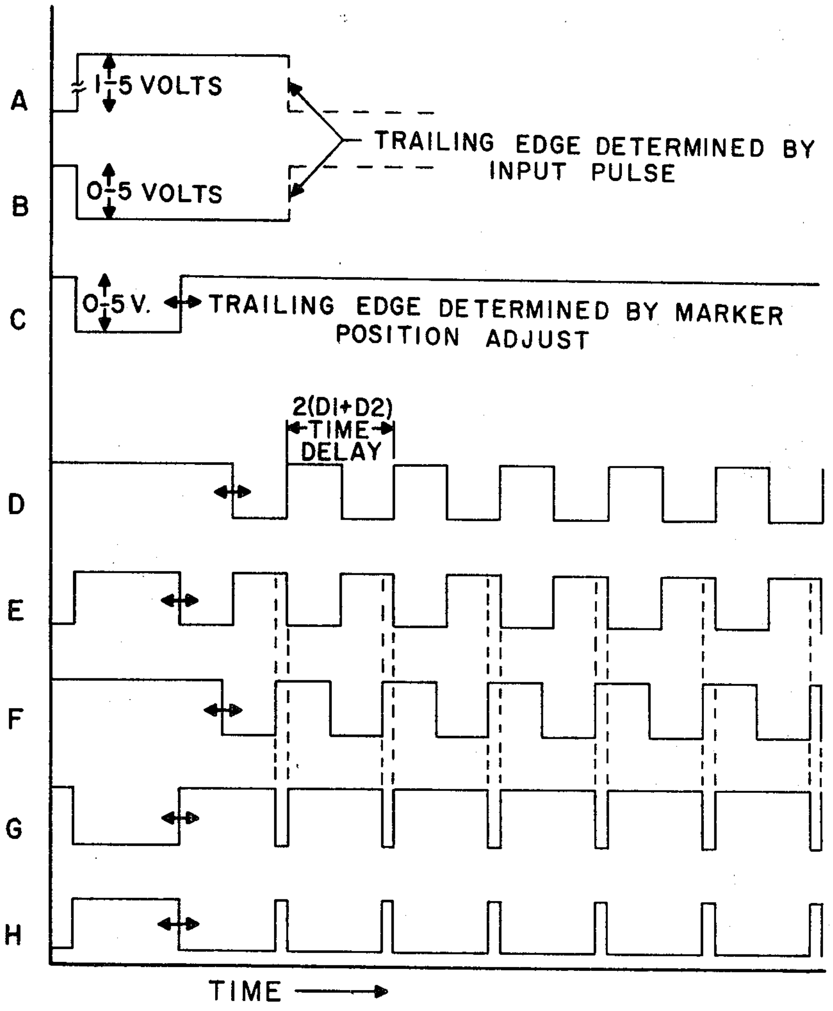

In the drawings:

FIG. 1 represents a schematic and block diagram of a time mark signal generator capable of operating in either a synchronous or free running mode of operation; and, FIG. 2, a family of eight waveforms, A, B, C, D, E, F, G, and H as these waveforms appear at locations A, B, C, D, E, F, G, and H in the circuit of FIG. 1.

Referring to the drawings:

In the time mark signal generator 10, of FIG. 1, a syn gating pulse signal source 11 is connected for feeding a sync pulse input signal through resistor 12 to two input terminals of NAND gate 13 with the junction of resistor 12 and the two input terminals of NAND gate 13 connected through resistor 14 and Zener diode 15, connected in parallel therewith, to ground. This is with the Zener diode cathode connected to the junction of resistor 12 and the inputs to NAND gate 13, and anode to ground. The output line 16 of NAND gate 13 is connected as an input to monostable multivibrator micrologic circuit 17 with an external adjustable capacitor 18 connected to terminals of the monostable multivibrator micrologic circuit 17 as effectively an outward extension part of RC timing network circuitry contained within the monostable multivibrator micrologic circuit itself. The output line 19 from the $\overline{Q}$ output terminal of monostable multivibrator micrologic circuit 17 is connected as an input to NAND gate 20. The output line 21 of NAND gate 20 is in turn connected through resistor 22 to positive voltage supply 23 to NAND gate 24 as one of the inputs thereof, and to a delay line coil 25, having a grounded shield 26. The grounded shield coil 25 is provided with a tap 27 effectively dividing the delay line coil 25 into $D_1$ and $D_2$ delay line sections with the $D_2$ section connected to the output line of NAND gate 21 and the $D_1$ section connected through resistor 27A to ground. The tap 27 of grounded shield coil 25 is connected both as additional input to NAND gate 24 and also through adjustable capacitor 28 to ground, and the junction of the coil 25 section $D^1$ and resistor 27A is connected back as an additional input to NAND gate 20. The output of NAND gate 24 is connected to two input terminals of NOR gate 29, the output of which is connected both through resistor 30 to positive voltage supply 23 and also to load 31 as the output of the time mark generator circuit 10. Please note that NAND gates 13, 20, and 24, multivibrator 17 and NOR gate 29 are all connected to voltage supply 23 and to ground.

Please note that the sync pulse signal source 11 is used to provide sync pulses initiated by, for example, transponder reply code signaling and with a duration in width at least matching the time duration of one period cycle of monostable multivibrator 17 to sync the system from the free running mode of operation. In any event, the generator produces relatively narrow pulses uniformly spaced in a pulse train with the pulse train synchronized in uniform relation to the start of each sync pulse out of signal source 11 as indicated in FIG. 1 from normally the free running mode with the $\overline{Q}$ output of the multivibrator normally in a relatively high voltage signal time mark generating state. The time mark pulse train partially shown for location H in FIG. 1 is at substantially the same time scale as the sync pulse shown out of source 11 and timewise extends beyond the relatively small portion of the time span width of the sync pulse. The ability of the time mark generator 10 to operate in either a synchronous or free running mode of operation is very useful in oscilloscope test pattern work and evaluation testing of transponder operational code reply capabilities since many existing time mark generators used heretofore in such test work are capable of operation in only one of the two modes. Please note that with system activating pulses out of signal source 11 varying, for example, from 2 to 50 volts peak to peak that Zener diode 15 is very effective in limiting amplitude of the activating sync signal input to NAND gate 13, thus, advantageously allowing for a wide range of synchronizing pulse signal input amplitude.

When the input of NAND gate 13 is at a very low voltage or substantially at ground since resistor 14 is a low value resistor and with no activating input from signal source 11, the gate is in the quiescent "off" state. Then when a positive sync pulse voltage such as indicated by waveform A of FIG. 2 for location A is applied, the output voltage from NAND gate 13 drops to a low voltage state at location B and as shown by waveform B in time sync with the leading edge of the activating sync input signal pulse. The leading edge of waveform B as an input trigger activates monostable multivibrator 17. The resulting complemented output waveform C from the multivibrator 17 at location C then inhibits NAND gate 20 for a predetermined length interval in the range of from 1 to 4 microseconds as determined by the preset value of adjustable value capacitor 18. Thus, in effect, the output time marker pulses are positioned in respect to the start of the sync input activating pulse by adjustment of capacitor 18.

The NAND gate 20, delay line coil 25, and NAND gate 24 portion of the time mark generator 10 is actually a delay line and logic control gated micrologic clock signal pulse train generator subcircuit having much in common with the subject matter of a patent application Ser. No. 769,285, filed Oct. 21, 1968, entitled "Delay Line Control Gated Micrologic Clock Generator" with the inventor Mr. Floyd M. Totten, one of the co-inventors of the subject matter of the present application and with both assigned to a common assignee. With this circuit as the signal voltage level out of the monostable multivibrator at location C returns to, relatively, a high voltage after each multivibrator 17 period, NAND gate 20 in delay line 25 and logic control gated clock signal pulse train generating action is activated to the pulse train generating (or oscillating) state. This operation results in waveform generation D at location D of FIG. 1 and waveform E at location E both with pulse or oscillation periods equal to $2(D_1+D_2)$ excluding the propagation delay of NAND gate 20 and with $D_1$ and $D_2$ being the delays through delay line sections $D_1$ and $D_2$, respectively. Waveform F which is waveform E as delayed through delay line section $D_2$ appearing at delay line tap 27 is applied along with waveform E as the two signal inputs fed to NAND gate 24. The resulting waveform G, appearing at the output of NAND gate 24 at location G, is applied as an input to the two input connections of NOR gate 29 to provide the desired inversion of the G waveform as the H waveform out of the NOR gate 29 at location H as the time mark signal to a load 31 which may be and is in practice an oscilloscope with the time mark pulses appearing as very narrow vertical positive or upright going pulses with very accurate spacing and in synced spaced relation relative to initiating trigger input sync pulses. The NOR gate 29 also serves, in addition to inverting the markers to positive pulses, as a gate isolating the load in a buffering action.

Please note that the trailing edge of waveforms A and B are determined by the input pulse from sync gating pulse signal source 11 and that signal waveform pulse edges for waveforms C, D, E, F, G, and H are shifted through an adjustment range by adjustment of variable capacitor 18 as a marker position adjustment. Note, however, that the values of delay line sections $D_1$ and $D_2$ determine marker pulse time width and waveform period and that these are adjustable for different marker pulse time widths and periods by changing the time delay values of $D_1$ and $D_2$. One adjustment accomplishing this, at least for marker pulse spacing, is adjustment of adjustable capacitor 28 and varying the capacitance value to ground at tap 27 of delay line coil 25.

Components and values used in a time mark generator 10 providing time marker pulses approximately 100 nanoseconds wide and a waveform H with a period approximating 1,000 nanoseconds include the following:

Sync pulse signal source 11—2–50 volts peak to peak
Resistors 12 and 14—470 ohms
NAND gates 13, 20, 24, and NOR gate 29—¼ DTL 946 each
Zener diode 15—1N751
Monostable multivibrator 17—DTL 951
Adjustable capacitor 18—100–500 pf.
Resistors 22 and 27—1K ohms
Positive voltage supply 23—+5 volts DC
Delay line section $D_1$—100 nanosecond delay
Delay line section $D_2$—400 nanosecond delay
Adjustable capacitor 28—9–35 pf.
Resistor 30—680 ohms Thus, there is hereby provided a time mark generator with normally a free running mode of operation that may be brought repeatedly to sync time registry in closely spaced time intervals. This provides a highly reliable tool as a precisely timed waveform with relatively narrow pulses and long periods extremely well suited for use as a time mark reference displayed on the face of a test oscilloscope or range display instrument.

Whereas this invention is here illustrated and described with respect to a single embodiment thereof, it should be realized that various changes may be made without departing from the essential contributions to the art made by the teachings hereof.

We claim:

1. In a timed signal pulse waveform generator, a monostable multivibrator having a normally high voltage output terminal connected as a signal input to a signal clock generator; signal source connective means for said monostable multivibrator whereby when an activating pulse is applied the multivibrator is triggered to shift said normally high voltage output terminal to a low voltage state and in a cycle back to the high voltage state; said signal clock generator including first and second NAND gate circuits with said first NAND gate circuit having a gating signal input terminal connected to said normally high voltage output terminal of said monostable multivibrator, and an inhibit input signal connection, and output signal connective means; delay line circuit means having at least first and second delay line sections connected to said NAND gate output connective means; said second NAND gate having first and second input terminals and an output terminal with the first input terminal connected to said output signal connective means of said first NAND gate circuit, and said second input terminal connected to said first delay line section of said delay line circuit means; connection of said second delay line section of said delay line circuit means to said inhibit input signal connection of said first NAND gate circuit; and output signal path means connected to a point in the circuit after said second NAND gate circuit.

2. The timed signal pulse waveform generator of claim 1 wherein, said delay line circuit means includes, a delay line coil having a coil tap dividing the delay line coil into said first and second delay line sections; the coil tap being connected as the first delay line section connection to said second input terminal of said second NAND gate circuit; and with the end of said second delay line section of said delay line coil remote from said coil tap connected as the connection of said second delay line section to said inhibit input signal connection of said first NAND gate circuit.

3. The timed signal pulse waveform generator of claim 2 wherein, said two section delay line coil is part of a voltage bias circuit connected between a voltage supply and a voltage potential reference source.

4. The timed signal pulse waveform generator of claim 2 wherein, said delay line coil has coil shielding with at least one of said delay line sections; and with said coil shielding connected to a voltage potential reference source.

5. The timed signal pulse waveform generator of claim 2 wherein, an adjustable value capacitor is connected between said coil tap and a voltage potential reference source.

6. The timed signal pulse waveform generator of claim 5 wherein, a resistor is connected between the connective junction between said second delay line coil section and said inhibit input signal connection of the first NAND gate circuit and said voltage potential reference source.

7. The timed signal pulse waveform generator of claim 1 wherein, an adjustable value capacitor is connected to terminals of the monostable multivibrator and forms an external extension of internal circuitry of the multivibrator as an adjustment therefor and as an adjustment for the waveform output developed by said generator .

8. The timed signal pulse waveform generator of claim 1 wherein, a third NAND gate is included with said generator circuit as part of said signal source connective means for said monostable multivibrator with two input terminals of said third NAND gate connected in common for receiving an input signal; and with the output of said third NAND gate connected to an input terminal of said multivibrator.

9. The timed signal pulse waveform generator of claim 8 wherein, a signal input circuit is provided including an input signal path resistor with one end connectable to an input signal source and the other end connected to the two common connected input terminals of said third NAND gate; and with the signal input circuit also including connection of the junction of said input signal path resistor and the two common connected input terminals of said third NAND gate through a second resistor and a Zener diode connected in parallel to a voltage potential reference source.

10. The timed signal pulse waveform generator of claim 9 wherein said Zener diode is connected in the circuit with cathode toward the junction of said input signal resistor and the two common connected inputs of said third NAND gate, and anode to said voltage potential reference source.

11. The timed signal pulse waveform generator of claim 1 wherein, said output signal path means includes a signal inverting circuit means having input terminal means connected to the output terminal of said second NAND gate circuit; and with said signal inverting circuit means having an output connection to a voltage bias circuit and for connection to a utilizing load.

12. The timed signal pulse waveform generator of claim 11 wherein, said signal inverting circuit means is a NOR gate circuit having two input terminals connected in common to the output terminal of said second NAND gate.

References Cited

UNITED STATES PATENTS 3,369,182 2/1968 Reindl ------------ 328—63 X

STANLEY D. MILLER, Jr., Primary Examiner

U.S. Cl. X.R.

307—208, 269; 328—72, 179

UNITED STATES PATENT OFFICE

CERTIFICATE OF CORRECTION

Patent No. 3,534,270 October 13, 1970

Kenneth R. Rutherford et al.

It is certified that error appears in the above identified patent and that said Letters Patent are hereby corrected as shown below:

In the heading to the printed specification, line 4, "Edward G. Tilhill" should read -- Edward G. Tuthill --. Column 1, line 15, "shot" should read -- short --; line 50, "if" should read -- of --. Column 2, line 18, "if" should read -- of --; line 65, "$D^1$" should read -- $D_1$ --.

Signed and sealed this 6th day of April 1971.

(SEAL)
Attest:

EDWARD M.FLETCHER,JR.
Attesting Officer

WILLIAM E. SCHUYLER, JR.
Commissioner of Patents